United States Patent
Kakadia et al.

(10) Patent No.: US 9,655,000 B2
(45) Date of Patent: May 16, 2017

(54) OPTIMIZED QUALITY OF SERVICE TRANSPORT ARCHITECTURE TO COMPENSATE FOR SINR VARIATIONS

(71) Applicant: Verizon Patent and Licensing Inc., Arlington, VA (US)

(72) Inventors: Deepak Kakadia, Antioch, CA (US); Stephen P. Boyd, Stanford, CA (US); Hai Shao, Fremont, CA (US); Yong Gao, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 273 days.

(21) Appl. No.: 14/463,141

(22) Filed: Aug. 19, 2014

(65) Prior Publication Data
US 2016/0057649 A1 Feb. 25, 2016

(51) Int. Cl.
*H04W 28/02* (2009.01)
*H04L 12/851* (2013.01)
*H04L 12/841* (2013.01)

(52) U.S. Cl.
CPC ..... *H04W 28/0268* (2013.01); *H04L 47/2433* (2013.01); *H04L 47/283* (2013.01); *H04W 28/0236* (2013.01)

(58) Field of Classification Search
CPC ............. H04L 47/2433; H04L 47/283; H04W 28/0236; H04W 28/0268
USPC ................................. 370/230, 329, 395.21
See application file for complete search history.

(56) References Cited

U.S. PATENT DOCUMENTS

| | | | |
|---|---|---|---|
| 2011/0274053 A1* | 11/2011 | Baik ................. | H04W 72/1242 370/329 |
| 2012/0131129 A1* | 5/2012 | Agarwal ............ | H04L 43/0852 709/216 |
| 2015/0049604 A1* | 2/2015 | Keith ................. | H04L 47/2441 370/230 |

OTHER PUBLICATIONS

Basir, "3GPP Long Term Evolution (LTE)," http://4g-lte-world.blogspot.com/2013/01/quality-of-service-gos-in-lte.html. Jan. 21, 2013, 4 pages.

\* cited by examiner

*Primary Examiner* — Mang Yeung
*Assistant Examiner* — Natali N Pascual Peguero

(57) ABSTRACT

A device may receive performance information for a traffic flow assigned to a quality of service (QoS) class. The device may determine an overall packet delay, associated with the traffic flow, based on the performance information. The device may determine a radio access network (RAN) delay, associated with the traffic flow, based on the performance information. The device may determine a target packet delay associated with the QoS class. The device may identify, based on the target packet delay, the RAN delay, and the overall packet delay, a QoS sub-class to which the traffic flow is to be assigned. The QoS sub-class may be associated with the QoS class. The device may cause packets, associated with the traffic flow, to be marked for treatment in accordance with the QoS sub-class.

20 Claims, 9 Drawing Sheets

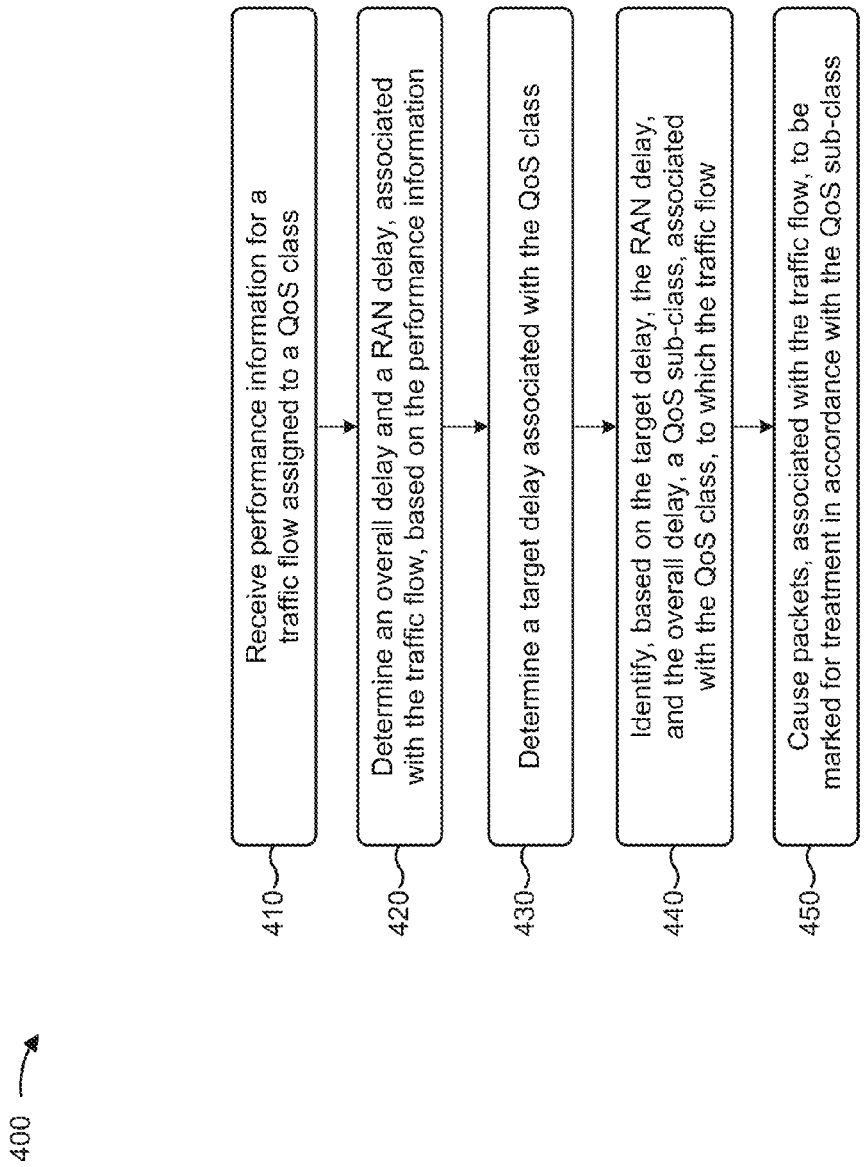

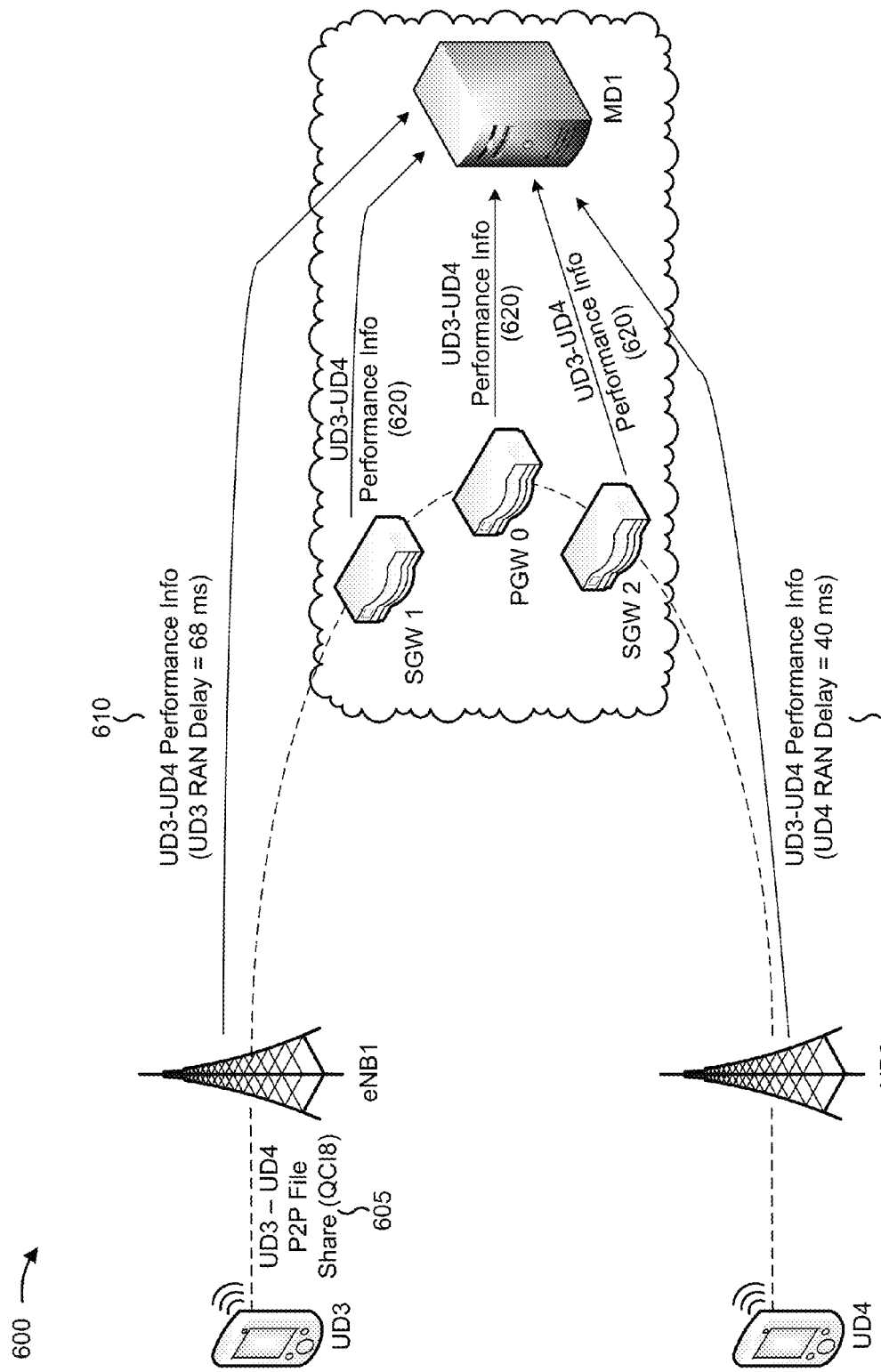

OPTIMIZED QUALITY OF SERVICE TRANSPORT ARCHITECTURE TO COMPENSATE FOR SINR VARIATIONS

BACKGROUND

The goal of quality of service (QoS) is to assure treatment for traffic travelling via a network such that one or more performance metrics (e.g., an amount of latency, an error rate, an amount of bandwidth, an amount of throughput, an amount of jitter, etc.) is as close as possible to satisfying a target performance metric. In some cases, the QoS treatment class associated with the traffic may be determined based on a QoS class identifier (QCI) (e.g., QCI1 through QCI9).

BRIEF DESCRIPTION OF THE DRAWINGS

FIG. 4 is a flow chart of an example process for identifying a QoS sub-class to which a traffic flow is to be assigned, and causing packets, associated with the traffic flow, to be marked for treatment in accordance with the QoS sub-class;

FIGS. 6A and 6B are diagrams of another example implementation relating to the example process shown in FIG. 4.

DETAILED DESCRIPTION OF PREFERRED EMBODIMENTS

Figure 1:
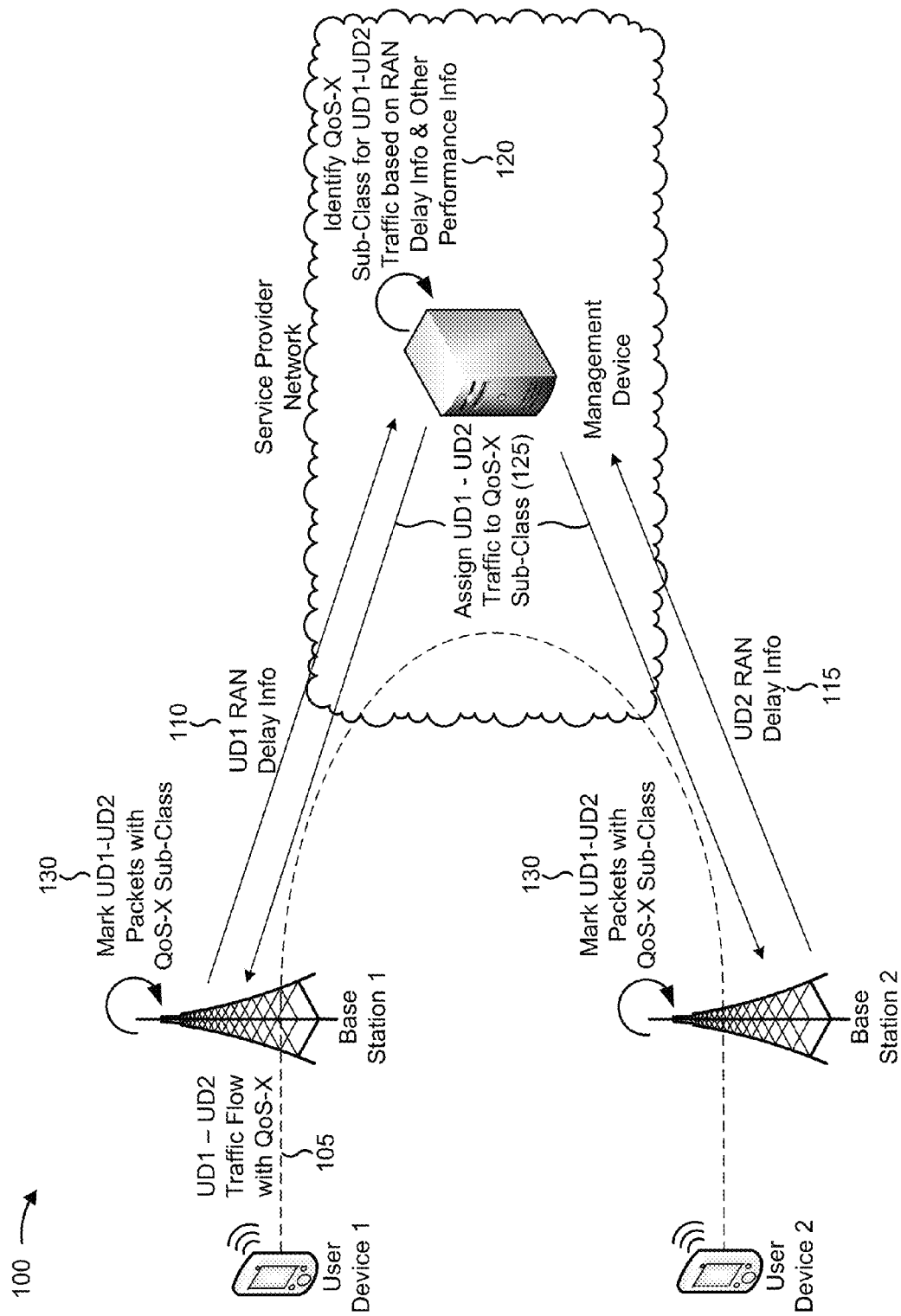
FIG. 1 is a diagram of an overview of an example implementation described herein.

The following detailed description of example implementations refers to the accompanying drawings. The same reference numbers in different drawings may identify the same or similar elements.

A traffic flow, associated with a device communicating via a base station included in a service provider network, may be treated in accordance with a particular QoS class (e.g., QCI1 through QCI9). For example, a traffic flow for a conversational voice service (e.g., a voice over internet protocol (VoIP) service) may be treated, by one or more devices included in the service provider network, in accordance with QCI1. As another example, a traffic flow for a transmission control protocol (TCP) based service (e.g., a web service, an email service, or the like) may be treated in accordance with QCI9.

A QoS class may include a set of target performance metrics for traffic flows assigned to the QoS class. One such target performance metric may be an overall (e.g., end-to-end) delay for packets assigned to the QoS class. While numerous factors may contribute to an overall delay associated with a traffic flow, radio access network (RAN) conditions (e.g., associated with a device communicating via a base station) may have a significant impact on the overall delay experienced by the traffic flow. For example, a distance between a user device and a base station, an elevation of the user device relative to the base station, interference associated with a signal between the user device and the base station, noise associated with the signal between the user device and the base station, antennae tilt associated with the base station, or the like. may have a significant impact on the overall delay. However, traffic flows assigned to the QoS class may be blindly forwarded without considering that one traffic flow is in danger of being out of specification due to bad RAN conditions, while another traffic flow may be over specification due to good RAN conditions. This may result in inefficient use of QoS resources.

Implementations described herein may allow a service provider to identify, based on a RAN delay associated with traffic flow, a QoS sub-class to which the traffic flow is to be assigned, and cause packets, associated with the traffic flow, to be marked for treatment in accordance with the QoS sub-class. As such, if the traffic flow is experiencing bad RAN conditions (e.g., an amount of RAN delay greater than a threshold, due to signal interference, noise, or the like), then the traffic flow may be placed in a higher priority QoS sub-class. This may allow additional QoS resources to be provided to the traffic flow. Similarly, if a traffic flow assigned to the particular QoS class has good RAN conditions (e.g., an amount of RAN delay less than a threshold), then the traffic flow may be placed in a lower priority QoS sub-class. This may allow QoS resources, unneeded by the traffic flow, to be made available to other traffic flows (e.g., traffic flows with bad RAN conditions).

FIG. 1 is a diagram of an overview of an example implementation 100 described herein. For the purposes of example implementation 100, assume that a first user device (e.g., user device 1 is communicating with a second user device (e.g., user device 2) via a service provider network that includes a first base station (e.g., base station 1), a second base station (e.g., base station 2), and a service provider network that includes a management device. Further, assume that user device 1 is connected to base station 1 via a RAN, and that user device 2 is connected to base station 2 via the RAN. Finally, assume that, as shown by reference number 105, the traffic flow between user device 1 and user device 2 may be assigned to a particular QoS class (e.g., QoS-X).

As shown by reference number 110, base station 1 may provide (e.g., periodically) RAN delay information, associated with user device 1, that identifies a RAN condition associated with the connection between user device 1 and base station 1. Similarly, as shown by reference number 115, base station 2 may provide RAN delay information, associated with user device 2, that identifies a RAN condition associated with the connection between user device 2 and base station 2. As shown by reference number 120, the management device may receive the RAN delay information associated with user device 1, the RAN delay information associated with user device 2, and other performance information associated with the traffic flow between user device 1 and user device 2 (e.g., gathered by one or more other devices included in the service provider network). As shown, the management device may identify, based on the RAN delay information and the other performance information, a QoS-X sub-class to which the traffic flow is to be assigned. As shown by reference number 125, the management device may provide, to base station 1 and base station 2, information indicating that the traffic flow between user device 1 and user device 2 is to be treated in accordance with the QoS-X sub-class. As shown by reference number 130, base station 1 and base station 2 may then mark packets, associated with the traffic flow between user device 1 and user device 2, to cause the packets to be treated in accordance with the QoS-X sub-class.

In this way, a service provider may identify, based on RAN conditions associated with traffic flow, a QoS sub-class to which the traffic flow is to be assigned, and may cause packets, associated with the traffic flow, to be marked for treatment in accordance with the QoS sub-class.

Figure 2:
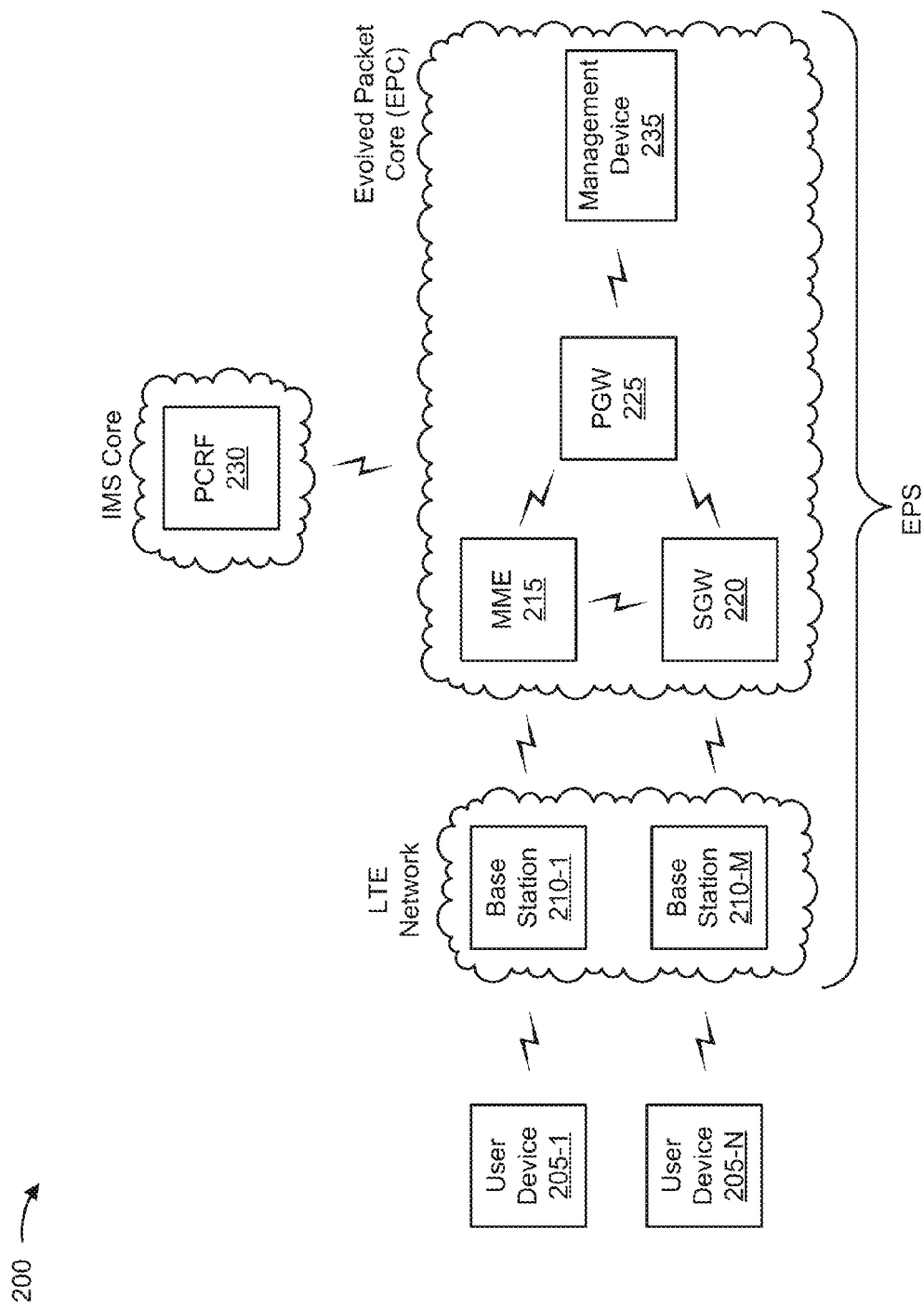
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user devices 205 (e.g., user device 205-1 and user device 205-N), base stations 210 (e.g., base station 210-1 and base station 210-M), a mobility management entity device (MME) 215, a serving gateway (SGW) 220, a packet data network gateway (PGW) 225, a policy and charging rules function server (PCRF) 230, and a management device 235. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a RAN that includes one or more base stations 210 that take the form of evolved Node Bs (eNBs) via which user devices 205 communicate with the EPC. The EPC may include MME 215, SGW 220, and/or PGW 225 that enable user devices 205 to communicate with other user devices 205, other networks (e.g., external to the EPC), and/or an Internet protocol (IP) multimedia subsystem (IMS) core. The IMS core may include PCRF 230. Alternatively, PCRF 230 may reside in the EPC.

User device 205 may include a device capable of receiving, generating, storing, processing, and/or providing information associated with communicating with one or more other devices, such as one or more other user devices 205. For example, user device 205 may include a communications and/or computing device, such as a mobile phone (e.g., a smart phone, a radiotelephone, etc.), a laptop computer, a tablet computer, a handheld computer, a gaming device, or a similar device. In some implementations, user device 205 may receive information from and/or transmit information to one or more other devices in environment 200.

Base station 210 may include one or more devices capable of transferring traffic, such as audio, video, text, and/or other traffic, destined for and/or received from user device 205. In some implementations, base station 210 may include an eNB associated with the LTE network that receives traffic from and/or sends traffic via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

In some implementations, base station 210 may be capable of determining a RAN delay associated with user device 205 connected to base station 210. For example, base station 210 may send, to user device 205, a known reference signal (e.g., Reference Signal Receive Power (RSRP)). User device 205 may compute a signal to noise ratio (SINR) based on the reference signal, and may send an indication of channel quality (e.g., a Channel Quality Indicator (CQI)) to base station 210. The CQI may provide a quantified indication of the RAN delay associated with user device 205. In some implementations, base station 210 may use the CQI to determine a modulation and coding scheme (MCS) for communication with user device 205 (e.g., such as a quadrature phase shift keying (QPSK) modulation scheme, a 16 quadrature amplitude modulation (QAM) modulation scheme, a 64QAM modulation scheme, or the like).

MME 215 may include one or more devices, such as one or more server devices, capable of managing authentication, activation, deactivation, and mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic (e.g., via PGW 225) to other networks and/or other network devices associated with the EPC and/or the IMS core. SGW 220 may also receive traffic from other networks and/or other network devices, and may send the received traffic to user device 205 via base station 210. Additionally, or alternatively, SGW 220 may perform operations associated with handing off user device 205 to and/or from an LTE network.

PGW 225 may include one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to another network. Additionally, or alternatively, PGW 225 may receive traffic from another network, and may send the traffic to user device 205 via SGW 220 and base station 210.

PCRF 230 may include a device, such as a server device or a group of server devices, capable of determining and/or enforcing policy rules. In some implementations, PCRF 230 may establish service rules for a communication session on a per user basis, a per user device 205 basis, a per service basis, etc. In some implementations, PCRF 230 may receive input regarding users, user devices 205, subscriptions, services, etc., may create quality of service and charging policy rules for the communication session, and may provide the policy rules to another device, such as base station 210, SGW 220, PGW 225, and/or management device 235, which may handle packets for the communication session based on the policy rules.

Management device 235 may include a device capable of receiving, determining, generating, processing, and/or providing information associated with assigning packets, associated with a traffic flow, to a QoS sub-class. For example, management device 235 may include a server device, or a group of server devices. In some implementations, management device 235 may be capable of receiving RAN delay information and/or performance information, associated with a traffic flow assigned to a QoS class, identifying a QoS sub-class to which the traffic flow is to be assigned, and causing packets, associated with the traffic flow, to be marked such that the packets are treated in accordance with the QoS sub-class.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
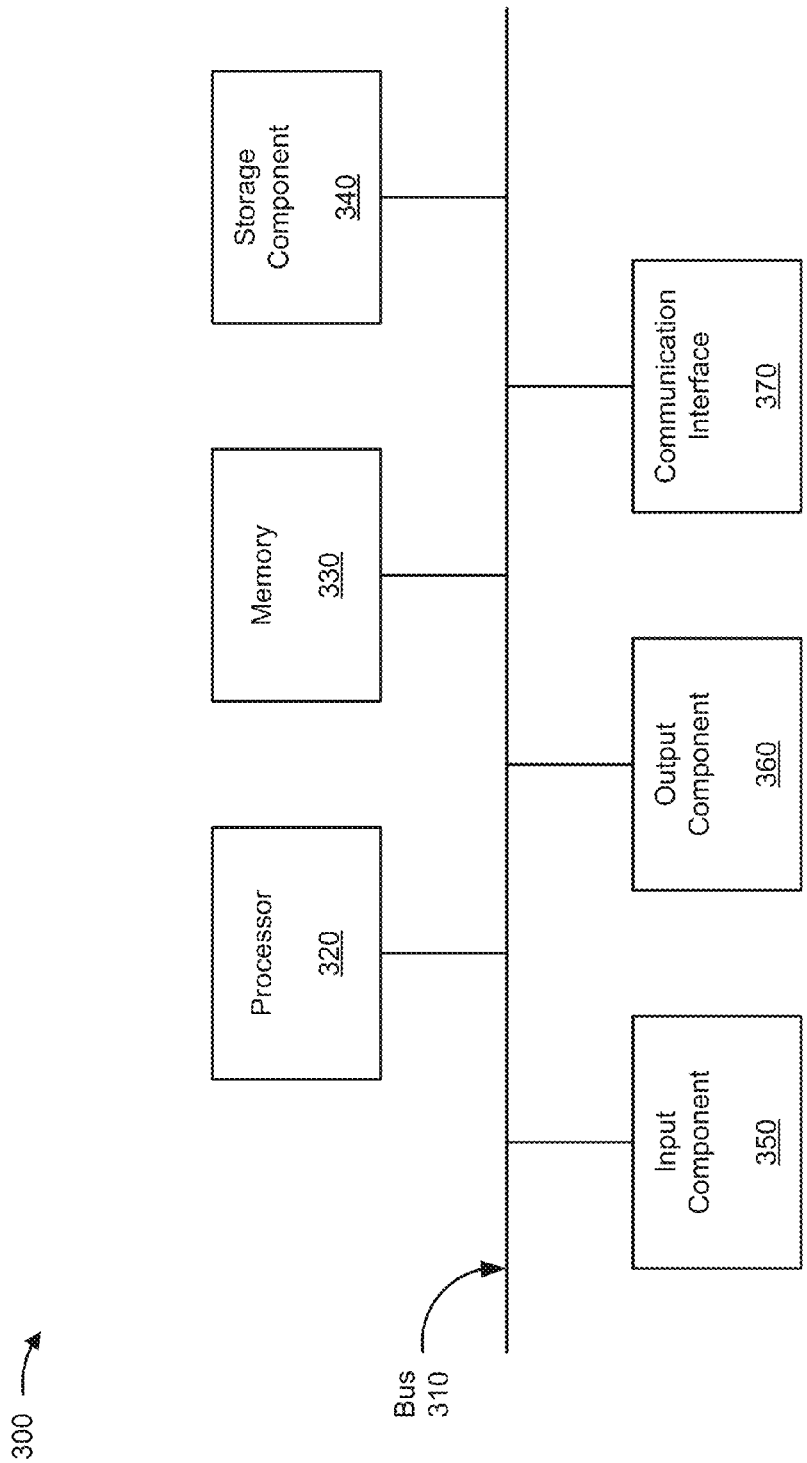
FIG. 3 is a diagram of example components of one or more devices of FIG. 2.

FIG. 3 is a diagram of example components of a device 300. Device 300 may correspond to user device 205, base station 210, MME 215, SGW 220, PGW 225, PCRF 230, and/or management device 235. In some implementations, user device 205, base station 210, MME 215, SGW 220, PGW 225, PCRF 230, and/or management device 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for identifying a QoS sub-class to which a traffic flow is to be assigned, and causing packets, associated with the traffic flow, to be marked for treatment in accordance with the QoS sub-class. In some implementations, one or more process blocks of FIG. 4 may be performed by management device 235. Additionally, or alternatively, one or more process blocks of FIG. 4 may be performed by another device or a group of devices separate from or including management device 235, such as another device included in environment 200.

As shown in FIG. 4, process 400 may include receiving performance information for a traffic flow assigned to a QoS class (block 410). For example, management device 235 may receive performance information for a traffic flow assigned to a QoS class. In some implementations, management device 235 may receive the performance information when the performance information is provided by another device, such as another device included in environment 200.

Performance information, for a traffic flow assigned to a QoS class, may include information associated with a performance metric for the traffic flow as the traffic flow travels via a service provider network. For example, the performance information may include information associated with an amount of delay (e.g., latency), an error rate, an amount of bandwidth, an amount of throughput, an amount of jitter, or the like. In some implementations, the QoS class may be assigned to the traffic flow based on a type of service associated with the traffic flow. For example, the 3GPP wireless communication standard technical specification 23.203 identifies types of services that may be assigned to each of nine QoS classes (e.g., QCI1 through QCI9).

In some implementations, the performance information may include information associated with an overall performance metric. For example, the performance information may include information that indicates an overall delay (e.g., an average end-to-end latency) for packets associated with the traffic flow. Additionally, or alternatively, the performance information may include information associated with a particular segment of a path via which the traffic flow travels. For example, the performance information may include information that indicates an average amount of delay experienced by packets as the packets travel through a particular device included in the service provider network. Additionally, or alternatively, the performance information may include information associated with a RAN delay associated with the traffic flow. For example, the performance information may include information that identifies an amount of RAN delay experienced by packets as the packets travel between user device 205 and base station 210 associated with the traffic flow.

In some implementations, management device 235 may receive the performance information from base station 210, MME 215, SGW 220, PGW 225, PCRF 230, and/or one or more other devices associated with the service provider network. In some implementations, management device 235 may receive the performance information on a periodic basis (e.g., every 100 milliseconds (ms), every second, every 10 seconds, etc.). Additionally, or alternatively, management device 235 may receive the performance information based on input (e.g., from a user associated with management device 235) indicating that management device 235 is to receive the performance information. Additionally, or alternatively, management device 235 may periodically request the performance information (e.g., without user input).

As further shown in FIG. 4, process 400 may include determining an overall delay and a RAN delay, associated with the traffic flow, based on the performance information (block 420). For example, management device 235 may determine an overall delay and a RAN delay, associated with the traffic flow, based on the performance information. In some implementations, management device 235 may determine the overall delay and the RAN delay after management device 235 receives the performance information for the traffic flow. Additionally, or alternatively, management device 235 may determine the overall delay and the RAN delay when management device 235 receives an indication that management device 235 is to determine the overall delay and the RAN delay.

An overall delay, as described above, may include an average amount of end-to-end latency associated with a traffic flow. For example, the overall delay may include an average delay experienced by packets from a time the packets are provided by a first user device 205, associated with a traffic flow, to a time the packets are received by a second user device 205 associated with the traffic flow. In some implementations, the overall delay may be associated with a particular interval of time (e.g., an average amount of overall delay for a 100 ms period of time, an average amount of overall delay for a one second period of time, an average amount of overall delay for a 10 second period of time, etc.). In some implementations, management device 235 may determine the overall delay based on the performance information. For example, the performance information may include information that identifies the overall delay (e.g., when another device, included in the service provider network, determines the overall delay and provides information associated with the overall delay to management device 235). As another example, the performance information may include information that identifies a group of delays (e.g., including one or more RAN delays), associated with one or more segments of the traffic flow, and management device 235 may combine the group of delays to determine the overall delay.

A RAN delay may include an amount of latency associated with packets traveling between user device 205 and base station 210. For example, the RAN delay may include an average delay experienced by packets from a time the packets are provided by user device 205, associated with a traffic flow, to a time the packets are received by base station 210 to which user device 205 is connected. In some implementations, the RAN delay may be associated with a particular interval of time (e.g., an average amount of RAN delay for a 100 ms period of time, an average amount of RAN delay for a one second period of time, an average amount of RAN delay for a 10 second period of time, etc.). In some implementations, management device 235 may determine the RAN delay based on the performance information. For example, the performance information may include information (e.g., provided by base station 210) that identifies the RAN delay. In some implementations, the RAN delay may include multiple RAN delays associated with the traffic flow. For example, if a first user device 205, connected to a first base station 210, is communicating with a second user device 205, connected to a second base station 210, then management device 235 may determine a first RAN delay, associated with the first user device 205 and the first base station 210, and a second RAN delay associated with the second user device 205 and the second base station 210.

As further shown in FIG. 4, process 400 may include determining a target delay associated with the QoS class (block 430). For example, management device 235 may determine a target delay associated with the QoS class. In some implementations, management device 235 may determine the target delay after management device 235 determines the overall delay and the RAN delay associated with the traffic flow. Additionally, or alternatively, management device 235 may determine the target delay when management device 235 receives an indication to determine the target delay. Additionally, or alternatively, management device 235 may determine the target delay when management device 235 receives information associated with the target delay from another device.

A target delay may include a delay, associated with a QoS class, that identifies a maximum allowable average amount of overall latency for traffic assigned to the QoS class. For example, the target delay for QoS class QCI1 may be 100 ms, the target delay for QoS class QCI2 may be 150 ms, and so forth. In some implementations, the target delay may be based on 3GPP technical specification 23.203, as described by the table below:

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice. Video (Live Streaming), Intractive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |

In some implementations, management device 235 may determine the target delay based on information stored by management device 235. For example, management device 235 may store information that identifies the target delay for the QoS class, and may determine the target delay for the traffic flow based on the stored information. Additionally, or alternatively, management device 235 may determine the target delay based on information received from another device. For example, management device 235 may request information associated with the target delay for the QoS class from PCRF 230, and may determine the target delay for the QoS class based on a response to the request.

As further shown in FIG. 4, process 400 may include identifying, based on the target delay, the RAN delay, and the overall delay, a QoS sub-class, associated with the QoS class, to which the traffic flow is to be assigned (block 440). For example, management device 235 may identify, based on the target delay, the RAN delay, and the overall delay, a QoS sub-class, associated with the QoS class, to which the traffic flow is to be assigned. In some implementations, management device 235 may identify the QoS sub-class after management device 235 determines the target delay associated with the QoS class. Additionally, or alternatively, management device 235 may identify the QoS sub-class after management device 235 determines the overall delay and/or the RAN delay associated with the traffic flow. Additionally, or alternatively, management device 235 may identify the QoS sub-class after management device 235 compares the target delay, the RAN delay, and/or the overall delay, as described below. Additionally, or alternatively, management device 235 may identify the QoS sub-class when management device 235 receives an indication that management device 235 is to identify the QoS sub-class.

A QoS sub-class may include a sub-class of a QoS class that has a higher or a lower relative priority than another sub-class associated with the QoS class. For example, QoS class QCI1 may be divided into two or more QoS sub-classes (e.g., QCI1.1, QCI1.2, QCI1.3, etc.), where each sub-class may have a higher or lower relative priority than one or more other sub-classes. As an example, a traffic flow assigned to QoS sub-class QCI1.1 may have a higher priority than a traffic flow assigned to QoS sub-class QCI1.2. Similarly, the traffic flow assigned to QoS sub-class QCI1.2 may have a higher priority than a traffic flow assigned to QoS sub-class QCI1.3. As such, traffic flows assigned to the same QoS class may be treated differently (e.g., in accordance with their respective QoS sub-classes). In some implementations, each QoS class may be divided into multiple sub-classes. For example, within an internet protocol (IP) network, each of nine QoS classes (e.g., QCI1 through QCI9) may be divided into two, three, four, five, six, or seven sub-classes (e.g., since a 6-bit differentiated services code point in an IP header is capable of identifying up to 64 QoS classes).

In some implementations, management device 235 may identify the QoS sub-class based on comparing the RAN delay, the overall delay, and the target delay. For example, management device 235 may compare the overall delay to the target delay, and may determine that the overall delay exceeds the target delay. Here, management device 235 may also compare the RAN delay to the overall delay. In this example, if the RAN delay exceeds a threshold percentage of the overall delay (e.g., if the RAN delay is greater than 50% of the overall delay), then management device 235 may determine that the traffic flow is to be assigned to a high priority QoS sub-class (e.g., in order to account for the large RAN delay contribution to the overall delay).

As another example, management device 235 may compare the overall delay to the target delay, and may determine that the overall delay is within a threshold percentage (e.g., within 10%) of the target delay (e.g., that the overall delay is greater than 90% of the target delay). Here, management device 235 may also compare the RAN delay to the overall delay. In this example, if the RAN delay exceeds a threshold percentage of the overall delay (e.g., if the RAN delay is greater than 60% of the overall delay), then management device 235 may determine that the traffic flow is to be assigned to a high priority QoS sub-class (e.g., in order to account for the large RAN delay contribution to the overall delay).

As yet another example, management device 235 may compare the overall delay to the target delay, and may determine that the overall delay is not within a threshold percentage (e.g., not within 10%) of the target delay (e.g., that the overall delay is less than 90% of the target delay). Here, management device 235 may also compare the RAN delay to the overall delay. In this example, if the RAN delay does not exceed a threshold percentage of the overall delay (e.g., if the RAN delay is less than 50% of the overall delay), then management device 235 may determine that the traffic flow is to be assigned to a low priority QoS sub-class (e.g., in order to allow unneeded QoS resources to be used by other traffic flows, since additional delay may be introduced without exceeding the target delay).

Additionally, or alternatively, management device 235 may identify the QoS sub-class based on a QoS sub-class assignment algorithm stored or accessible by management device 235. For example, management device 235 may provide, as inputs to the QoS sub-class assignment algorithm, the overall delay, the RAN delay, and/or the target delay, and may receive, as an output, information that identifies a QoS sub-class to which the traffic flow is to be assigned. In this way management device 235, may determine a RAN delay, associated with a traffic flow assigned to a QoS class and may identify a QoS sub-class, associated with the QoS class, to which the traffic flow is to be assigned. This may allow QoS resources to be shifted from traffic flows experiencing good RAN conditions (e.g., an amount of RAN delay less than a threshold) to traffic flows experiencing bad RAN conditions (e.g., an amount of RAN delay greater than a threshold).

As further shown in FIG. 4, process 400 may include causing packets, associated with the traffic flow, to be marked for treatment in accordance with the QoS sub-class (block 450). For example, management device 235 may cause packets, associated with the traffic flow, to be marked for treatment in accordance with the QoS sub-class. In some implementations, management device 235 may cause the packets to be marked after management device 235 identifies the QoS sub-class to which the traffic flow is to be assigned. Additionally, or alternatively, management device 235 may cause the packets to be marked after management device 235 receives an indication that management device 235 is to cause the packets to be marked after management device 235.

In some implementations, management device 235 may cause the packets to be marked based on providing information associated with the identified QoS sub-class. For example, management device 235 may identify a QoS sub-class to which the traffic flow is to be assigned, and may provide an indication that the traffic flow is to be assigned to the QoS sub-class. In some implementations, management device 235 may provide the indication to base station 210. Here, base station 210 may receive the indication, and may mark packets, associated with the traffic flow accordingly (e.g., such that the packets are treated in accordance with the QoS sub-class). Additionally, or alternatively, management device 235 may provide the indication to another device included in the service provider network (e.g., PGW 225, SGW 220, MME 215, and/or another device in the service provider network), and the other device may provide the indication to base station 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
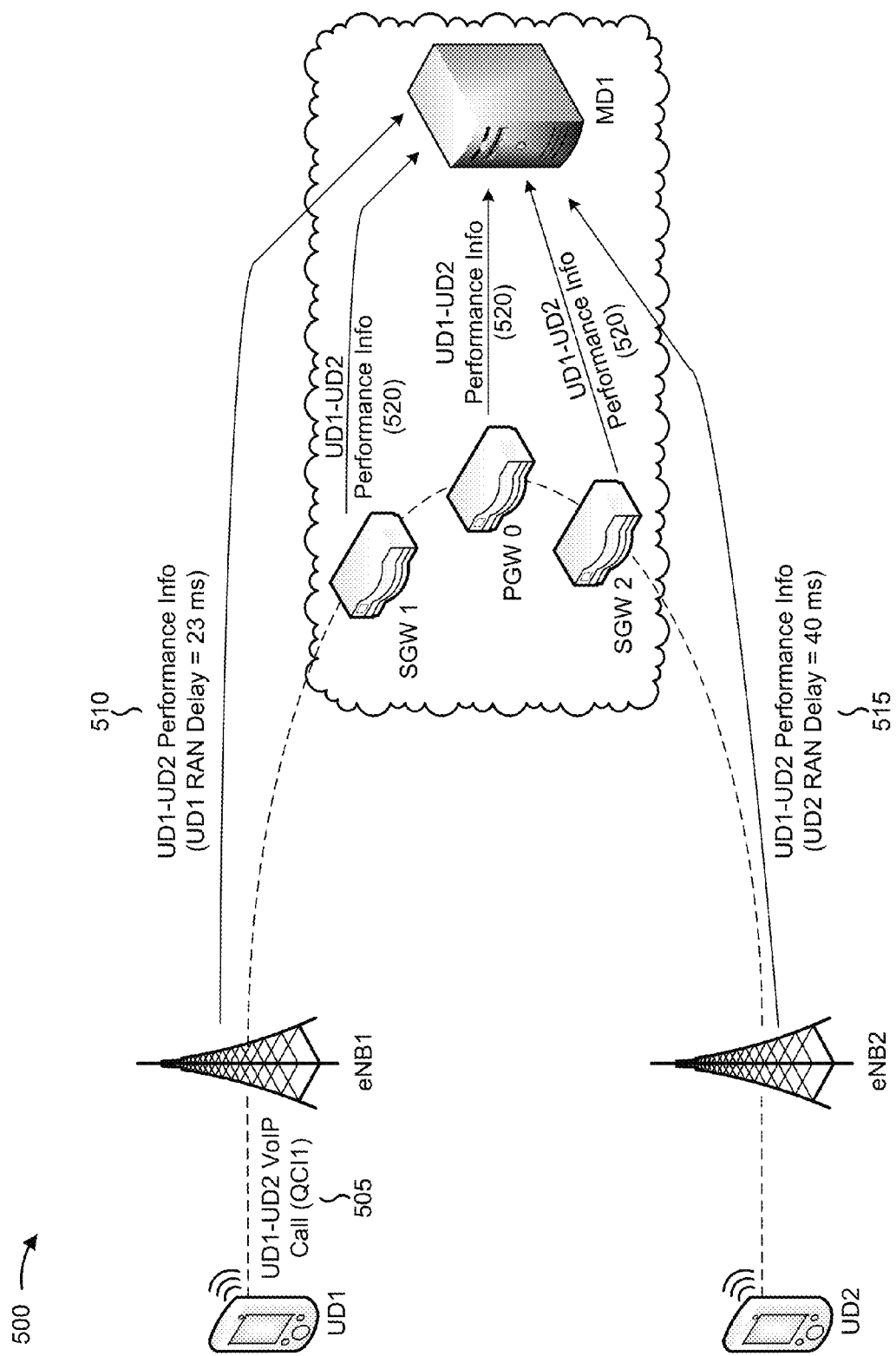
FIGS. 5A-5C are diagrams of an example implementation relating to the example process shown in FIG. 4.
Figure 5B:
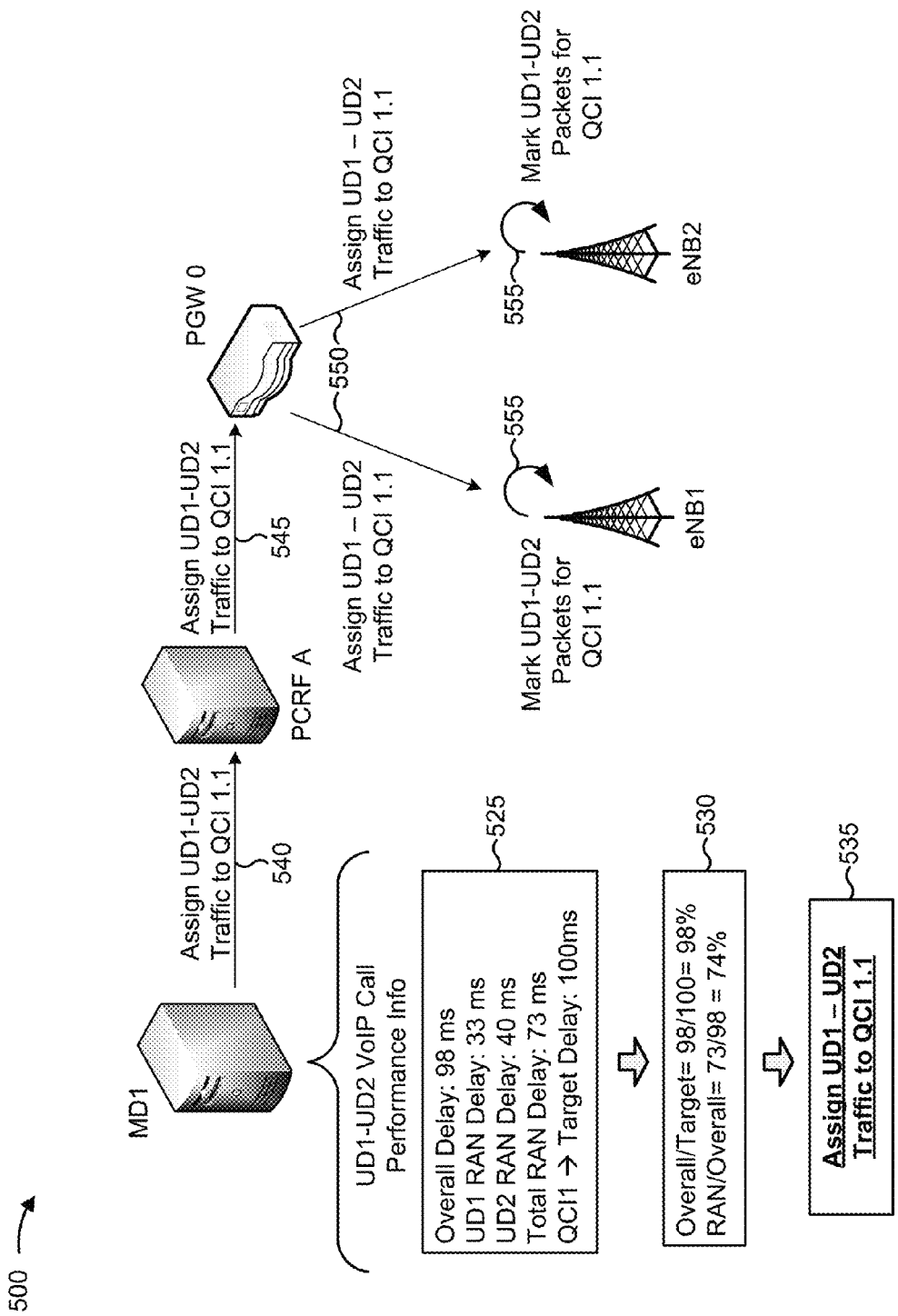
Figure 5C:
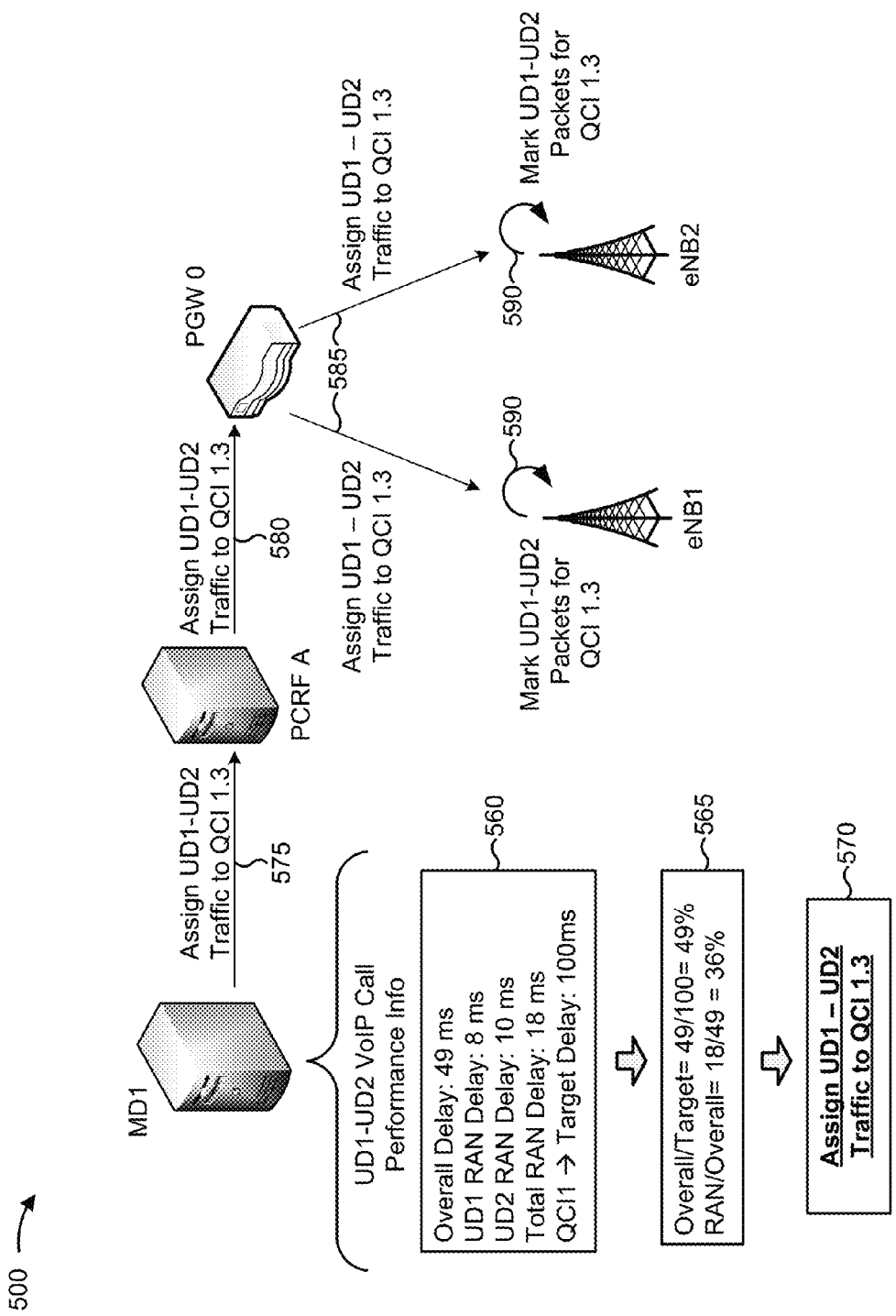

FIGS. 5A-5C are diagrams of an example implementation 500 relating to example process 400 shown in FIG. 4. For the purposes of example implementation 500, assume that a first user device 205 (e.g., UD1) is communicating with a second user device 205 (e.g., UD2) via a first base station 210 (e.g., eNB1), a second base station 210 (e.g., eNB2), a pair of SGWs 220 (e.g., SGW1 and SGW2), and PGW 225 (e.g., PGW0) included in a service provider network, and that the service provider network also includes PCRF 230 (e.g., PCRF A) and management device 235 (e.g., MD1). Further, assume that UD1 is connected to eNB1 via a RAN, and that UD2 is connected to eNB2 via the RAN. Finally, assume that, as shown by reference number 505, UD1 is communicating with UD2 on a VoIP call, and that the traffic flow for the UD1-UD2 VoIP call is assigned to receive QoS treatment in accordance with QoS class QCI1.

As shown by reference number 510, eNB1 may provide (e.g., at a first interval of time), to MD1, RAN delay information associated with UD1 that identifies a RAN delay associated with the connection between UD1 and eNB1. As shown, the RAN delay information for UD1 may indicate that the traffic flow experienced (e.g., during a first period of time) an average of 23 ms of RAN delay as a result of RAN conditions between UD1 and eNB1. Similarly, as shown by reference number 515, eNB2 may provide (e.g., at the first interval of time), to MD1, RAN delay information associated with UD2 that identifies a RAN delay associated with the connection between UD2 and eNB2. As shown, the RAN delay information for UD2 may indicate that the traffic flow experienced (e.g., during the first period of time) an average of 40 ms of RAN delay as a result of RAN conditions between UD2 and eNB2. As shown by reference number 520, MD1 may also receive (e.g., from SGW1, SGW2, and/or PGW0) other performance information associated with the UD1-UD2 VoIP traffic flow.

As shown in FIG. 5B, and by reference number 525, MD1 may determine, based on the RAN delay information and/or the other performance information, an overall delay UD1-UD2 VoIP traffic flow (e.g., Overall Delay: 98 ms), a UD1 RAN delay (e.g., UD1 RAN Delay: 33 ms), a UD2 RAN delay (e.g., UD2 RAN Delay: 40 ms), and a total RAN delay (e.g., Total RAN delay: 73 ms). As further shown, MD1 may also determine (e.g., based on stored information, based on information provided by PCRF A) that a target delay (e.g., a maximum allowable delay) for QCI1 traffic is 100 ms. As shown by reference number 530, MD1 may determine, that the overall delay is 98% of the maximum allowable target delay (e.g., Overall/Target=98/100=98%). As further shown, MD1 may determine, that the total RAN delay is 74% of the overall delay (e.g., RAN/Overall=73/98=74%).

In this example, assume that each QoS class (e.g., QCI1 through QCI9) has been divided into a high priority sub-class (e.g., QCI1.1), a medium priority sub-class (e.g., QCI1.2), and a low priority sub-class (e.g., QCI1.3). Further, assume that MD1 is configured to assign a traffic flow to a high priority QoS sub-class when the overall delay is greater than 70% of the target delay and when the total RAN delay is greater than 70% of the overall delay. As shown by reference number 535, MD1 may determine that the UD1-UD2 VoIP traffic flow is to be assigned to QoS sub-class QCI1.1 since the overall delay is 98% of the target delay (which is greater than 70%) and since the total RAN delay is 74% of the overall delay (which is greater than 70%).

As shown by reference number 540, MD1 may provide, to PCRF A, information indicating that packets associated with the UD1-UD2 VoIP traffic flow are to be assigned to QoS sub-class QCI1.1. As shown by reference number 545, PCRF A may forward, to PGW0, the information indicating that packets associated with the UD1-UD2 VoIP traffic flow are to be assigned to QoS sub-class QCI1.1. As shown by reference number 550, PGW0 may then forward, to eNB1 and eNB2, the information indicating that packets associated with the UD1 -UD2 VoIP traffic flow are to be assigned to QoS sub-class QCI1.1. Finally, as shown by reference number 555, eNB1 and eNB2 may receive the information, and may begin marking packets, associated with the UD1-UD2 traffic flow, for treatment in accordance with QoS sub-class QCI1.1.

For the purposes of FIG. 5C, assume that MD1 has received (e.g., at a second interval of time) second RAN delay information, associated with UD1, that identifies a second RAN delay associated with the connection between UD1 and eNB1 that indicates that the traffic flow experienced (e.g., during a second period of time) an average of 8 ms of RAN delay as a result of RAN conditions between UD1 and eNB1 (e.g., the RAN conditions for the connection between UD1 and eNB1 have improved). Similarly, assume that MD1 has received (e.g., at the second interval of time)

second RAN delay information, associated with UD2, that identifies a second RAN delay associated with the connection between UD2 and eNB2 that indicates that the traffic flow experienced (e.g., during the second period of time) an average of 10 ms of RAN delay as a result of the connection between UD2 and eNB2 (e.g., the RAN conditions for the connection between UD2 and eNB2 have also improved). Finally, assume that MD1 has also received (e.g., from SGW1, SGW2, and/or PGW0) second other performance information associated with the UD1-UD2 VoIP traffic flow.

As shown by reference number 560, MD1 may determine, based on the second RAN delay information and/or the second other performance information, a second overall delay UD1-UD2 VoIP traffic flow (e.g., Overall Delay: 49 ms), a second UD1 RAN delay (e.g., UD1 RAN Delay: 8 ms), a second UD2 RAN delay (e.g., UD2 RAN Delay: 10 ms), and a second total RAN delay (e.g., Total RAN delay: 18 ms). As shown by reference number 565, MD1 may determine, that the overall delay is 49% of the maximum allowable target delay (e.g., Overall/Target=49/100=49%). As further shown, MD1 may determine, that the total RAN delay is 36% of the overall delay (e.g., RAN/Overall=18/49=36%).

In this example, assume that MD1 is configured to assign a traffic flow to a low priority QoS sub-class when the overall delay is less than 50% of the target delay and when the total RAN delay is less than 50% of the overall delay. As shown by reference number 570, MD1 may determine that the UD1-UD2 VoIP traffic flow is to be assigned to QoS sub-class QCI1.3 since the overall delay is 49% of the target delay (which is less than 50%) and since the total RAN delay is 36% of the overall delay (which is less than 50%).

As shown by reference number 575, MD1 may provide, to PCRF A, information indicating that packets associated with the UD1-UD2 VoIP traffic flow are to be assigned to QoS sub-class QCI1.3. As shown by reference number 580, PCRF A may forward, to PGW0, the information indicating that packets associated with the UD1-UD2 VoIP traffic flow are to be assigned to QoS sub-class QCI1.3. As shown by reference number 585, PGW0 may then forward, to eNB1 and eNB2, the information indicating that packets associated with the UD1-UD2 VoIP traffic flow are to be assigned to QoS sub-class QCI1.3. Finally, as shown by reference number 590, eNB1 and eNB2 may receive the information, and may begin marking packets, associated with the UD1-UD2 traffic flow, for treatment in accordance with QoS sub-class QCI1.3.

As indicated above, FIGS. 5A-5C are provided merely as an example. Other examples are possible and may differ from what was described with regard to FIGS. 5A-5C.

Figure 6B:
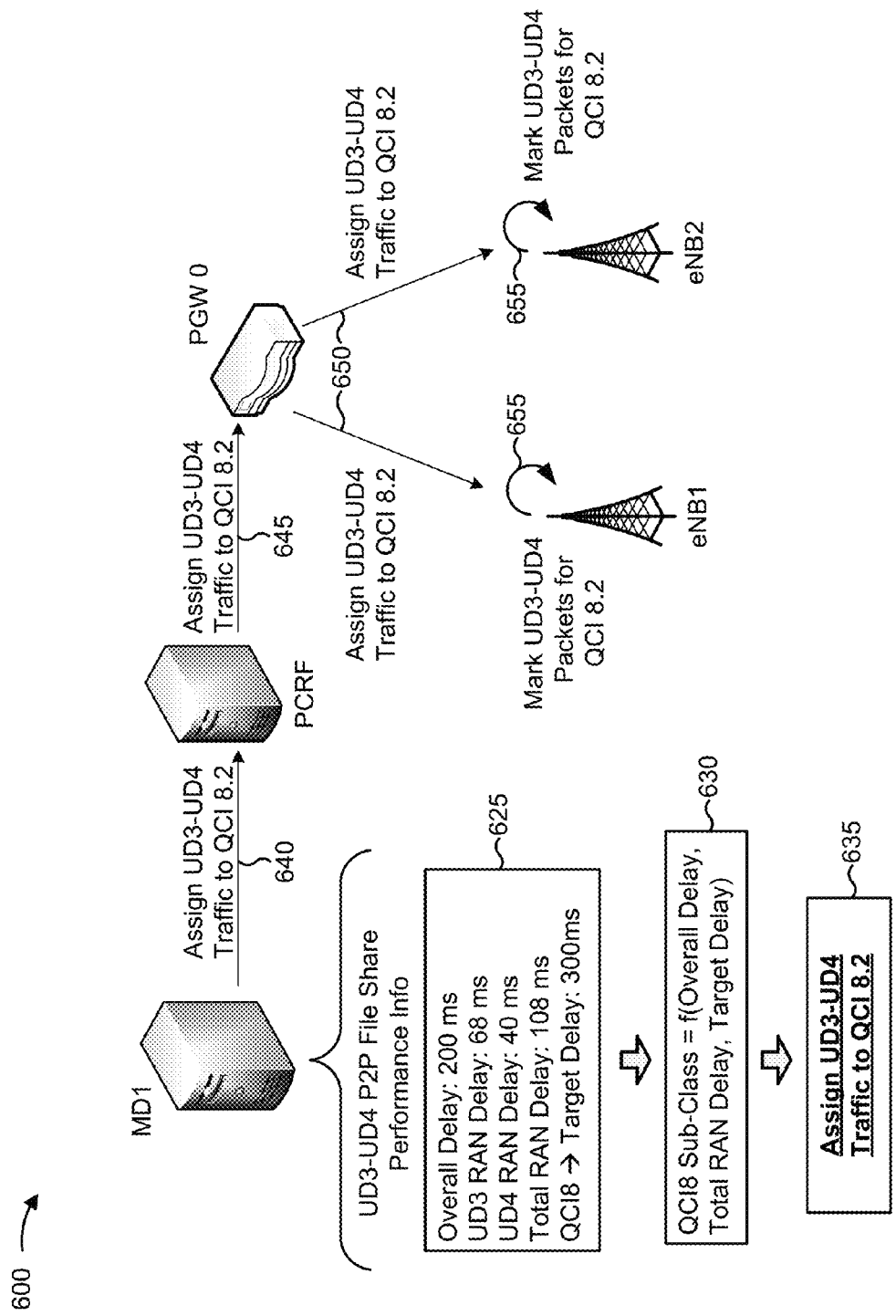

FIGS. 6A and 6B are diagrams of another example implementation 600 relating to example process 400 shown in FIG. 4. For the purposes of FIGS. 6A and 6B, assume that a first user device 205 (e.g., UD3) is communicating with a second user device 205 (e.g., UD4) via a first base station 210 (e.g., eNB1), a second base station 210 (e.g., eNB2), a pair of SGWs 220 (e.g., SGW1 and SGW2), and PGW 225 (e.g., PGW0) included in a service provider network, and that the service provider network also includes PCRF 230 (e.g., PCRF A) and management device 235 (e.g., MD1). Further, assume that UD3 is connected to eNB1 via a RAN, and that UD4 is connected to eNB2 via the RAN. Finally, assume that, as shown by reference number 605, that UD3 is communicating with UD4 regarding a peer-to-peer (P2P) file share, and that the traffic flow for the UD3-UD4 P2P file share is assigned to receive QoS treatment in accordance with QoS class QCI8.

As shown by reference number 610, eNB1 may provide (e.g., at a first interval of time), to MD1, RAN delay information associated with UD3 that identifies a RAN delay associated with the connection between UD3 and eNB1. As shown, the RAN delay information for UD3 may indicate that the traffic flow experienced (e.g., during a first period of time) an average of 68 ms of RAN delay as a result of RAN conditions between UD3 and eNB1. Similarly, as shown by reference number 615, eNB2 may provide (e.g., at the first interval of time), to MD1, RAN delay information associated with UD4 that identifies a RAN delay associated with the connection between UD4 and eNB2. As shown, the RAN delay information for UD4 may indicate that the traffic flow experienced (e.g., during the first period of time) an average of 40 ms of RAN delay as a result of RAN conditions between UD4 and eNB2. As shown by reference number 620, MD1 may also receive (e.g., from SGW1, SGW2, and/or PGW0) other performance information associated with the UD3-UD4 P2P file share traffic flow.

As shown in FIG. 6B, and by reference number 625, MD1 may determine, based on the RAN delay information and/or the other performance information, an overall delay for the UD3-UD4 P2P file share traffic flow (e.g., Overall Delay: 200 ms), a UD3 RAN delay (e.g., UD3 RAN Delay: 68 ms), a UD4 RAN delay (e.g., UD4 RAN Delay: 40 ms), and a total RAN delay (e.g., Total RAN delay: 108 ms). As further shown, MD1 may also determine (e.g., based on stored information, based on information provided by PCRF A) that a target delay (e.g., a maximum allowable delay) for QCI8 traffic is 300 ms.

In this example, assume that each QoS class (e.g., QCI1 through QCI9) has been divided into a high priority sub-class (e.g., QCI8.1), a medium priority sub-class (e.g., QCI8.2), and a low priority sub-class (e.g., QCI8.3). As shown by reference number 630, MD1 may provide the overall delay, the total RAN delay, and the target delay as inputs to a QoS sub-class assignment algorithm (e.g., stored or accessible by MD1). As shown by reference number 635, MD1 may receive, as an output of the algorithm, an indication that packets associated with the UD3-UD4 P2P file share traffic flow are to be assigned to QoS sub-class QCI8.2.

As shown by reference number 640, MD1 may provide, to PCRF A, information indicating that packets associated with the UD3-UD4 P2P file share traffic flow are to be assigned to QoS sub-class QCI8.2. As shown by reference number 645, PCRF A may forward, to PGW0, the information indicating that packets associated with the UD3-UD4 P2P file share traffic flow are to be assigned to QoS sub-class QCI8.2. As shown by reference number 650, PGW0 may then forward, to eNB1 and eNB2, the information indicating that packets associated with the UD3-UD4 P2P file share traffic flow are to be assigned to QoS sub-class QCI8.2. Finally, as shown by reference number 655, eNB1 and eNB2 may receive the information, and may begin marking packets, associated with the UD3-UD4 P2P file share traffic flow, for treatment in accordance with QoS sub-class QCI8.2.

As indicated above, FIGS. 6A and 6B are provided merely as an example. Other examples are possible and may differ from what was described with regard to FIGS. 6A and 6B.

Implementations described herein may allow a service provider to identify, based on a RAN delay associated with traffic flow, a QoS sub-class to which the traffic flow is to be assigned, and cause packets, associated with the traffic flow, to be marked for treatment in accordance with the QoS sub-class. As such, if the traffic flow is experiencing bad RAN conditions (e.g., an amount of RAN delay greater than a threshold, due to signal interference, noise, or the like), then the traffic flow may be placed in a higher priority QoS sub-class. This may allow additional QoS resources to be provided to the traffic flow. Similarly, if a traffic flow assigned to the particular QoS class has good RAN conditions (e.g., an amount of RAN delay less than a threshold), then the traffic flow may be placed in a lower priority QoS sub-class. This may allow QoS resources, unneeded by the traffic flow, to be made available to other traffic flows (e.g., traffic flows with bad RAN conditions).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, a packet may refer to a network packet, a frame, a datagram, a segment, a fragment of a network packet, a fragment of a frame, a fragment of a datagram, a fragment of a segment, or any other formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory storing one or more instructions; and
   one or more processors to execute the one or more instructions to:
      receive performance information for a traffic flow assigned to a quality of service (QoS) class;
      determine an overall delay, associated with the traffic flow, based on the performance information,
         the overall delay including information associated with an average amount of end-to-end latency associated with the traffic flow;
      determine a radio access network (RAN) delay, associated with the traffic flow, based on the performance information,
         the RAN delay including information associated with an amount of latency associated with packets traveling between a user device and a base station;
      compare the RAN delay and the overall delay;
      identify, based on comparing the RAN delay and the overall delay, a QoS sub-class to which the traffic flow is to be assigned,
         the QoS sub-class being associated with the QoS class; and
      cause packets, associated with the traffic flow, to be marked for treatment in accordance with the QoS sub-class.

2. The device of claim 1, where the one or more processors are further to:
   determine a first RAN delay based on the performance information,
      the first RAN delay being associated with a connection between a first user device and a first base station;
   determine a second RAN delay based on the performance information,
      the second RAN delay being associated with a connection between a second user device and a second base station; and
   where the one or more processors, when determining the RAN delay, are further to:
      determine the RAN delay as a sum of the first RAN delay and the second RAN delay.

3. The device of claim 1, where the QoS class is divided into a high priority QoS sub-class, a medium priority QoS sub-class, and a low priority QoS sub-class; and
   where the one or more processors, when identifying the QoS sub-class to which the traffic flow is to be assigned, are to:
      identify the QoS sub-class as the high priority QoS sub-class, the medium priority QoS sub-class, or the low priority QoS sub-class.

4. The device of claim 1, where the one or more processors are further to:
   provide information associated with the overall delay and information associated with the RAN delay as inputs to a QoS sub-class assignment algorithm; and receive, as an output, information identifying the QoS sub-class to which the traffic flow is to be assigned; and where the one or more processors, when identifying the QoS sub-class to which the traffic flow is to be assigned, are to:
identify the QoS sub-class to which the traffic flow is to be assigned based on receiving the information identifying the QoS sub-class to which the traffic flow is to be assigned.

5. The device of claim 1, where the one or more processors are further to:
provide an indication that the packets are to be marked for treatment in accordance with the QoS sub-class; and
where the one or more processors, when causing the packets to be marked for treatment in accordance with the QoS sub-class, are to:
cause the packets to be marked for treatment based on providing the indication.

6. The device of claim 1, where the performance information is first performance information, the overall delay is a first overall delay, the RAN delay is a first RAN delay, and the QoS sub-class is a first QoS sub-class,
where the one or more processors are further to:
receive second performance information for the traffic flow;
determine a second overall delay, associated with the traffic flow, based on the second performance information;
determine a second RAN delay, associated with the traffic flow, based on the second performance information;
identify, based on the second RAN delay and the second overall delay, a second QoS sub-class to which the traffic flow is to be assigned,
the second QoS sub-class being different than the first QoS sub-class, and
the second QoS sub-class being associated with the QoS class; and
cause other packets, associated with the traffic flow, to be marked for treatment in accordance with the second QoS sub-class.

7. The device of claim 1, where the performance information includes information associated with a particular segment of a path via which the traffic flow travels.

8. A computer-readable medium storing instructions, the instructions comprising:
one or more instructions that, when executed by one or more processors, cause the one or more processors to:
determine an overall packet delay associated with a traffic flow,
the overall packet delay including information associated with an average amount of end-to-end latency associated with the traffic flow, and
the traffic flow being assigned to a quality of service (QoS) class;
determine a radio access network (RAN) delay associated with the traffic flow,
the RAN delay including information associated with an amount of latency associated with packets traveling between a user device and a base station;
compare the RAN delay and the overall packet delay;
identify a QoS sub-class, of a plurality of QoS sub-classes associated with the QoS class, to which the traffic flow is to be assigned,
the QoS sub-class being identified based on comparing the RAN delay and the overall packet delay; and
cause packets, associated with the traffic flow, to be treated in accordance with the QoS sub-class.

9. The computer-readable medium of claim 8, where the one or more instructions, when executed by the one or more processors, further cause the one or more processors to:
receive performance information associated with the traffic flow; and
where the one or more instructions, that cause the one or more processors to determine the RAN delay associated with the traffic flow, cause the one or more processors to:
determine the RAN delay based on the performance information associated with the traffic flow.

10. The computer-readable medium of claim 8, where the one or more instructions, when executed by the one or more processors, further cause the one or more processors to:
provide information associated with the overall packet delay and information associated with the RAN delay as inputs to a QoS sub-class assignment algorithm; and
receive, as an output, information identifying the QoS sub-class to which the traffic flow is to be assigned; and
where the one or more instructions, that cause the one or more processors to identify the QoS sub-class to which the traffic flow is to be assigned, cause the one or more processors to:
identify the QoS sub-class to which the traffic flow is to be assigned based on receiving the information identifying the QoS sub-class to which the traffic flow is to be assigned.

11. The computer-readable medium of claim 8, where the one or more instructions, when executed by the one or more processors, further cause the one or more processors to:
provide an indication that the packets are to be treated in accordance with the QoS sub-class; and
where the one or more instructions, that cause the one or more processors to cause the packets to be treated in accordance with the QoS sub-class, cause the one or more processors to:
cause the packets to be treated in accordance with the QoS sub-class based on providing the indication.

12. The computer-readable medium of claim 8, where the overall packet delay is a first overall packet delay, the RAN delay is a first RAN delay, and the QoS sub-class is a first QoS sub-class; and
where the one or more instructions, when executed by the one or more processors, further cause the one or more processors to:
determine a second overall packet delay associated with the traffic flow;
determine a second RAN delay associated with the traffic flow;
identify, based on the second RAN delay and the second overall packet delay, a second QoS sub-class, of the plurality of QoS sub-classes, to which the traffic flow is to be assigned,
the second QoS sub-class being different from the first QoS sub-class; and
cause other packets, associated with the traffic flow, to be treated in accordance with the second QoS sub-class.

13. The computer-readable medium of claim 8, where the packets, associated with the traffic flow, are treated in accordance with the QoS sub-class based on the RAN delay exceeding a threshold.

14. The computer-readable medium of claim 8, where the one or more instructions, when executed by the one or more processors, further cause the one or more processors to:

determine whether the RAN delay exceeds a threshold percentage of the overall packet delay; and determine that the traffic flow is to be assigned to the QoS sub-class based on determining that the RAN delay exceeds the threshold percentage of the overall packet delay.

15. A method, comprising:

receiving, by a device, performance information associated with a traffic flow,
   the traffic flow being assigned to a quality of service (QoS) class;

determining, by the device and based on the performance information, an average end-to-end packet delay associated with the traffic flow,
   the average end-to-end packet delay including information associated with an average amount of end-to-end latency associated with the traffic flow;

determining, by the device and based on the performance information, an average radio access network (RAN) delay associated with the traffic flow,
   the average RAN delay including information associated with an average amount of latency associated with packets traveling between a user device and a base station;

comparing, by the device, the RAN delay and the average end-to-end packet delay;

identifying, by the device, a QoS sub-class to which the traffic flow is to be assigned,
   the QoS sub-class being identified based on comparing the average RAN delay; and the average end-to-end packet delay, and
   the QoS sub-class being associated with the QoS class; and causing, by the device, packets, associated with the traffic flow, to be marked for treatment in accordance with the QoS sub-class.

16. The method of claim 15, further comprising:

determining a first average RAN delay based on the performance information,
   the first average RAN delay being associated with a connection between a first device and a first base station;

determining a second average RAN delay based on the performance information,
   the second average RAN delay being associated with a connection between a second device and a second base station; and where determining the average RAN delay further comprises:
   determining the average RAN delay based on the first average RAN delay and the second average RAN delay.

17. The method of claim 15, where the QoS class is divided into a high priority QoS sub-class, a medium priority QoS sub-class, and a low priority QoS sub-class; and where identifying the QoS sub-class to which the traffic flow is to be assigned further comprises:
   identifying the QoS sub-class as the high priority QoS sub-class, the medium priority QoS sub-class, or the low priority QoS sub-class.

18. The method of claim 15, further comprising:

providing information associated with the average end-to-end packet delay and information associated with the average RAN delay as inputs to a QoS sub-class assignment algorithm; and receiving, as an output, information identifying the QoS sub-class to which the traffic flow is to be assigned; and where identifying the QoS sub-class to which the traffic flow is to be assigned comprises:
   identifying the QoS sub-class to which the traffic flow is to be assigned based on receiving the information identifying the QoS sub-class to which the traffic flow is to be assigned.

19. The method of claim 15, where the performance information is a first performance information, the average end-to-end packet delay is a first average end-to-end packet delay, the average RAN delay is a first average RAN delay, and the QoS sub-class is a first QoS sub-class; and where the method further comprises:
   receiving second performance information for the traffic flow;
   determining a second average end-to-end packet delay, associated with the traffic flow, based on the second performance information;
   determining a second average RAN delay, associated with the traffic flow, based on the second performance information;
   identifying, based on the second average RAN delay and the second average end-to-end delay, a second QoS sub-class to which the traffic flow is to be assigned,
      the second QoS sub-class being associated with the QoS class; and
   causing other packets, associated with the traffic flow, to be marked for treatment in accordance with the second QoS sub-class.

20. The method of claim 19, where the first QoS sub-class has a different priority than the second QoS sub-class, and where the method further comprises:
   assigning the traffic flow to the first QoS sub-class based on whether the RAN delay exceeds a threshold percentage of the average end-to-end packet delay.

* * * * *